United States Patent
Timmins et al.

(10) Patent No.: US 11,740,153 B2
(45) Date of Patent: Aug. 29, 2023

(54) METHOD AND APPARATUS FOR PERFORMING CONTAINER CLOSURE INTEGRITY TESTING

(71) Applicant: LIGHTHOUSE INSTRUMENTS, LLC, Charlottesville, VA (US)

(72) Inventors: Michael A. Timmins, Charlottesville, VA (US); Ken G. Victor, Charlottesville, VA (US)

(73) Assignee: LIGHTHOUSE INSTRUMENTS, LLC, Charlottesville, VA (US)

( * ) Notice: Subject to any disclaimer, the term of this patent is extended or adjusted under 35 U.S.C. 154(b) by 400 days.

(21) Appl. No.: 17/078,517

(22) Filed: Oct. 23, 2020

(65) Prior Publication Data

US 2022/0128431 A1    Apr. 28, 2022

(51) Int. Cl.
*G01M 3/32*    (2006.01)
(52) U.S. Cl.
CPC .................. *G01M 3/329* (2013.01)
(58) Field of Classification Search
CPC ........................................... G01M 3/329
USPC ........................................................ 73/49.3
See application file for complete search history.

(56) References Cited

U.S. PATENT DOCUMENTS

| | | | | |
|---|---|---|---|---|
| 3,678,756 A * | 7/1972 | Merrill | ........... | G01M 3/202 73/49.3 |
| 3,738,158 A * | 6/1973 | Farrell | ........... | G01M 3/329 73/49.3 |
| 4,733,973 A * | 3/1988 | Machak | ........... | G01N 25/00 73/49.3 |
| 4,893,499 A * | 1/1990 | Layton | ........... | G01M 3/363 73/49.3 |
| 5,345,814 A * | 9/1994 | Cur | ........... | G01M 3/227 73/49.3 |
| 5,369,983 A * | 12/1994 | Grenfell | ........... | G01M 3/229 73/49.3 |
| 6,964,191 B1 * | 11/2005 | Tata | ........... | G01N 15/082 73/49.3 |
| 8,087,286 B2 * | 1/2012 | Bothe | ........... | G01N 5/025 73/49.3 |
| 9,891,132 B2 | 2/2018 | Wertli | | |
| 2015/0211955 A1 * | 7/2015 | Bounouar | ........... | G01M 3/38 73/49.3 |

* cited by examiner

*Primary Examiner* — John Fitzgerald
*Assistant Examiner* — Rodney T Frank
(74) *Attorney, Agent, or Firm* — GREENBLUM & BERNSTEIN, P.L.C.

(57) ABSTRACT

A method and an apparatus for detecting a defect in a sealed container are provided. The method includes: placing the sealed container in a pressure chamber; filling the chamber with a liquid that is saturated by a test gas such that the sealed container is fully submerged; subjecting the chamber to a pressurized volume of a gaseous mixture that includes the test gas, and then removing the sealed container from the chamber; performing a laser-based headspace analysis of the sealed container in order to measure a partial pressure of the test gas; and using a result thereof to determine whether the sealed container has the defect. The defect may be located on a body of the sealed container that is at or below a level of a product that is contained within the sealed container.

18 Claims, 4 Drawing Sheets

METHOD AND APPARATUS FOR PERFORMING CONTAINER CLOSURE INTEGRITY TESTING

BACKGROUND

1. Field of the Disclosure

This technology generally relates to methods and systems for detecting leaks in closed containers, and more particularly to methods and systems for identifying a defect in optically transparent containers in which the defect may be clogged by the presence of a substance in the defect.

2. Background Information

A common method of leak testing sealed containers is to expose said containers to a pressure cycle and perform a measurement which is sensitive to the ingress or egress of gas or liquid into or out of the container as a result of the pressure cycle. Dye ingress methods rely on external overpressure to force a tracer liquid, such as, for example, methylene blue dye, through a defect into a container. Headspace analysis methods typically use a tunable diode laser to detect a change of the container headspace gas composition due to the ingress or egress of gas into or out of a defect in the container. Gas exchange can occur via effusion or diffusion depending on the pressure difference between the volume in the container and the environment outside the container. Each of these methods has corresponding strengths and weaknesses.

Dye ingress methods are frequently employed because liquid ingress is the primary and practical mode of microbial ingress. Such methods have typically relied on a visual comparison of the color of the liquid product post pressure cycle to standard containers with varying amounts of dye mixed in, leading to a rather subjective test result. In an attempt to provide more quantitative test results, optical spectrometers have been used to detect the presence of dye in the container. Although these methods are destructive in nature, lack sensitivity and are typically not quantitative, they remain in widespread use.

Headspace analysis is extremely sensitive to changes in the gas composition in a transparent container, but relies on gas exchange through the defect. Due to liquid surface tension, for defects below the liquid level, as the defect size decreases, the external pressure required to force gas through the defect into the container increases. Depending on the container, this can limit the size of the smallest detectable defect.

All of the above methods require an open path through the defect for liquid or gas exchange to occur. However, it is not uncommon for substances in the product which the container is designed to contain to block or plug small defects, thereby preventing the exchange of liquid or gas.

Accordingly, there is a need for a method and an apparatus that is designed identify defects in containers that may be blocked or clogged b the presence of such substances.

SUMMARY

The present disclosure combines the high sensitivity of headspace analysis with the widely accepted use of a liquid ingress test. The use of a liquid mitigates the surface tension issues that may arise with pressurized gas ingress tests, while simultaneously offering the possibility of dissolving substances which may plug a small defect. In this manner, the present disclosure, through one or more of its various aspects, embodiments, and/or specific features or sub-components, provides, inter alia, various methods, systems, apparatuses, and devices for identifying a defect in optically transparent containers in which the defect may be clogged by the presence of a substance in the defect.

A method and an apparatus for providing a means for detecting leaks in optically transparent containers are disclosed. The method increases the likelihood of identifying a package defect that may be dogged by product in the defect. The method utilizes a vessel containing a liquid bath in which containers are immersed and exposed to a pressure cycle that forces liquid through the defect. Once inside the test container, the liquid releases dissolved gas into the container headspace, which is then quantitatively detected using laser spectroscopy. The method overcomes a significant issue in package integrity testing caused by defects which are masked by the presence of product at the defect location.

According to an aspect of the present disclosure, a method for detecting a defect in a sealed container is provided. The method includes: placing the sealed container in a pressurizable chamber; filling the chamber with at least a first amount of a first liquid that is saturated by a first gas, the first amount being sufficient to cause the sealed container to be fully submerged within the first liquid; subjecting the chamber to a pressurized volume of a first gaseous mixture that includes the first gas for at least a predetermined interval of time, the pressurized volume of the first gaseous mixture having a pressure level that is greater than a preexisting pressure exerted within the sealed container; after the predetermined interval of time has elapsed, removing the sealed container from the chamber; measuring a partial pressure of the first gas contained within the sealed container and determining, based on a result of the measuring, whether the sealed container has the defect.

The first liquid may include at least one from among water, an organic solvent, and an alcohol solution.

The sealed container may contain a second amount of a substance that includes at least one from among a second liquid and a solid material. The second amount may correspond to a level of the substance such that when the sealed container is vertically oriented, the second amount of the substance is contained below the level within the sealed container, and such that a second gaseous mixture is contained above the level within the sealed container. The defect may be located on a body of the sealed container that is below the level of the substance.

The measuring may include performing a laser-based analysis of a portion of the sealed container that is above the level of the substance.

The substance may include a pharmaceutical product that includes at least one from among a salt, an excipient, and an active ingredient. A detectability of the defect may be reduced by a presence of the substance within the defect.

When the substance includes the second liquid, the first liquid may eliminate a surface tension between the first liquid and the second liquid at the defect, such that the subjecting of the chamber to the pressurized volume of the first gaseous mixture causes the first liquid to flow into the sealed container via the defect.

The substance within the defect may become dissolved in the first liquid, such that the subjecting of the chamber to the pressurized volume of the first gaseous mixture causes the first liquid to flow into the sealed container via the defect.

The first liquid may be a 70% isopropyl alcohol (IPA) solution in water.

The first gaseous mixture may include air.

The first gas may include at least one from among nitrogen, oxygen, and carbon dioxide.

According to another exemplary embodiment, an apparatus for detecting a defect in a sealed container is provided. The apparatus includes: a pressurizable chamber configured to receive the sealed container and to receive at least a first amount of a first liquid that is saturated by a first gas, the first amount being sufficient to cause the sealed container to be fully submerged within the first liquid; a gas cylinder configured to supply a pressurized volume of a first gaseous mixture to the chamber for at least a predetermined interval of time, the pressurized volume of the first gaseous mixture having a pressure level that is greater than a preexisting pressure exerted within the sealed container; and a measuring device configured to measure a partial pressure of the first gas from within the sealed container after the predetermined interval of time. The defect is detectable based on a result of the measured partial pressure of the first gas.

The first liquid may include at least one from among water, an organic solvent, and an alcohol solution.

The sealed container may be configured to contain a second amount of a substance that includes at least one from among a second liquid and a solid material. The second amount may correspond to a level of the substance such that when the sealed container is vertically oriented, the second amount of the substance is contained below the level within the sealed container, and a second gaseous mixture is contained above the level within the sealed container. The defect may be located on a body of the sealed container that is below the level of the substance.

The measuring device may include a headspace analysis device configured to perform a laser-based analysis of a portion of the sealed container that is above the level of the substance.

The substance may include a pharmaceutical product that includes at least one from among a salt, an excipient, and an active ingredient. A detectability of the defect may be reduced by a presence of the substance within the defect.

When the substance includes the second liquid, the first liquid may be configured to eliminate a surface tension between the first liquid and the second liquid at the defect, such that when the chamber is subjected to the pressurized volume of the first gaseous mixture, the first liquid is caused to flow into the sealed container via the defect.

The first liquid may be configured to cause the substance within the defect to become dissolved in the first liquid, such that when the chamber is subjected to the pressurized volume of the first gaseous mixture, the first liquid is caused to flow into the sealed container via the defect.

The first liquid may be a 70% isopropyl alcohol (IPA) solution in water.

The first gaseous mixture may include air.

The first gas may include at least one from among nitrogen, oxygen, and carbon dioxide.

According to yet another exemplary embodiment, a method for detecting a defect in a first sealed container is provided. The method includes: placing a plurality of sealed containers in a pressurizable chamber, the plurality of sealed containers including the first sealed container; filling the chamber with at least a first amount of a first liquid that is saturated by a first gas, the first amount being sufficient to cause each of the plurality of sealed containers to be fully submerged within the first liquid; subjecting the chamber to a pressurized volume of a first gaseous mixture that includes the first gas for at least a predetermined interval of time, the pressurized volume of the first gaseous mixture having a pressure level that is greater than an ambient pressure being exerted on the plurality of sealed containers by the first liquid; after the predetermined interval of time has elapsed, removing the plurality of sealed containers from the Chamber; measuring a partial pressure of the first gas contained within the first sealed container; and determining, based on a result of the measuring, whether the first sealed container has the defect. The first sealed container may contain a second amount of a substance that includes at least one from among a second liquid and a solid material, the second amount corresponding to a level of the substance such that when the first sealed container is vertically oriented, the second amount of the substance is contained below the level within the first sealed container and a second gaseous mixture is contained above the level within the first sealed container. The substance may include a pharmaceutical product that includes at least one from among a salt, an excipient, and an active ingredient. A detectability of the defect may be reduced by a presence of the substance within the defect.

The measuring may include performing a laser-based analysis of a portion of the first sealed container that is above the level of the substance.

The defect may be located on a body of the first sealed container that is below the level of the substance.

The defect may be located on a body of the first sealed container that is at least partially above the level of the substance.

When the substance includes the second liquid, the first liquid may cause a reduction in an amount of surface tension between the first liquid and the second liquid at the defect, such that the subjecting of the chamber to the pressurized volume of the first gaseous mixture causes the first liquid to flow into the first sealed container via the defect.

The substance within the defect may become dissolved in the first liquid, such that the subjecting of the chamber to the pressurized volume of the first gaseous mixture causes the first liquid to flow into the first sealed container via the detect.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The present disclosure proposes a method for testing the closure integrity of sealed containers. There are only two requirements on the types of containers to be tested: First, at least part of each container is optically transparent and partially filled with gas or at vacuum, thereby allowing the transmission of near-infrared light through the container; and second, each containers is capable of withstanding some amount of overpressure, and in some cases a partial vacuum, on an order of magnitude that is typically experienced during container shipment via air or ground freight.

Figure 1:
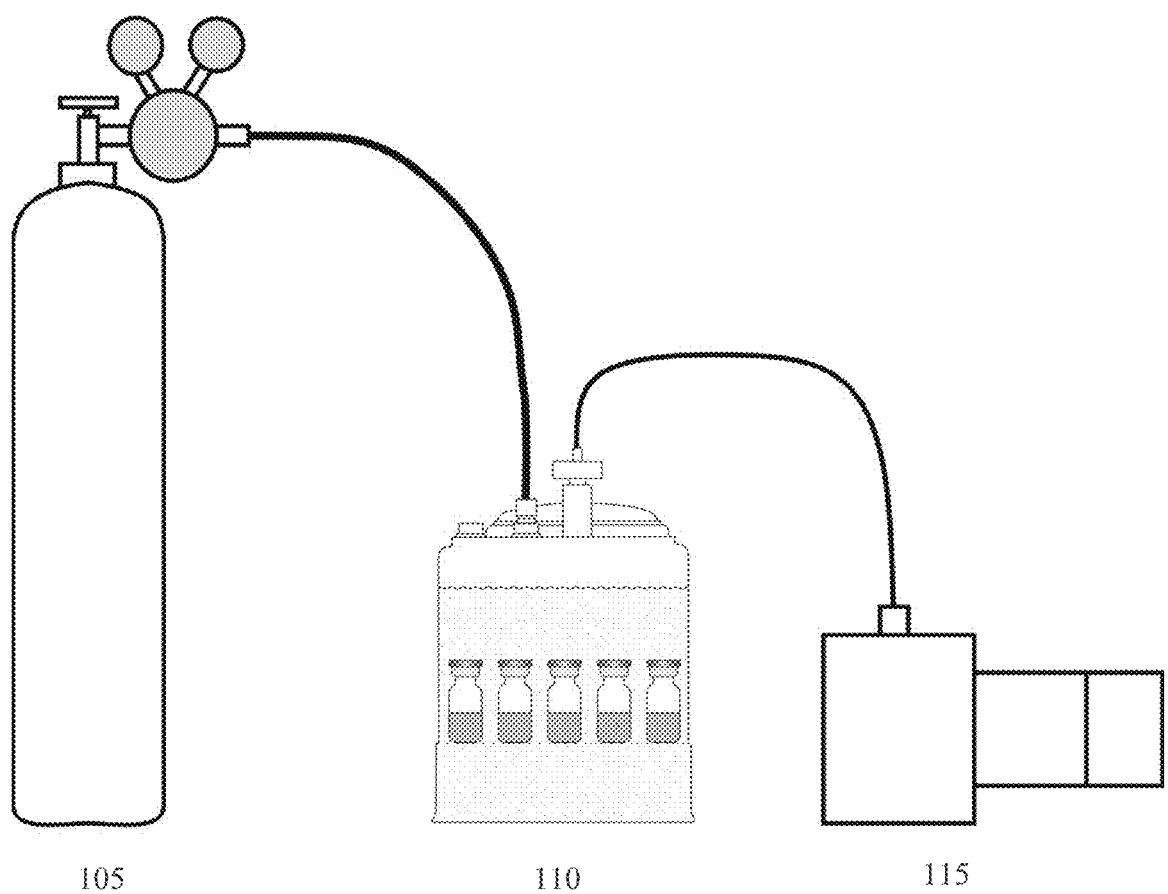
FIG. 1 is a schematic diagram of components of a leak testing apparatus, according to an exemplary embodiment.

Referring to FIG. 1, a schematic diagram 100 of components of a leak testing apparatus is illustrated, according to an exemplary embodiment. The components include a gas cylinder with regulator 105, a pressure vessel 110, and an optional vacuum pump 115.

Figure 2:
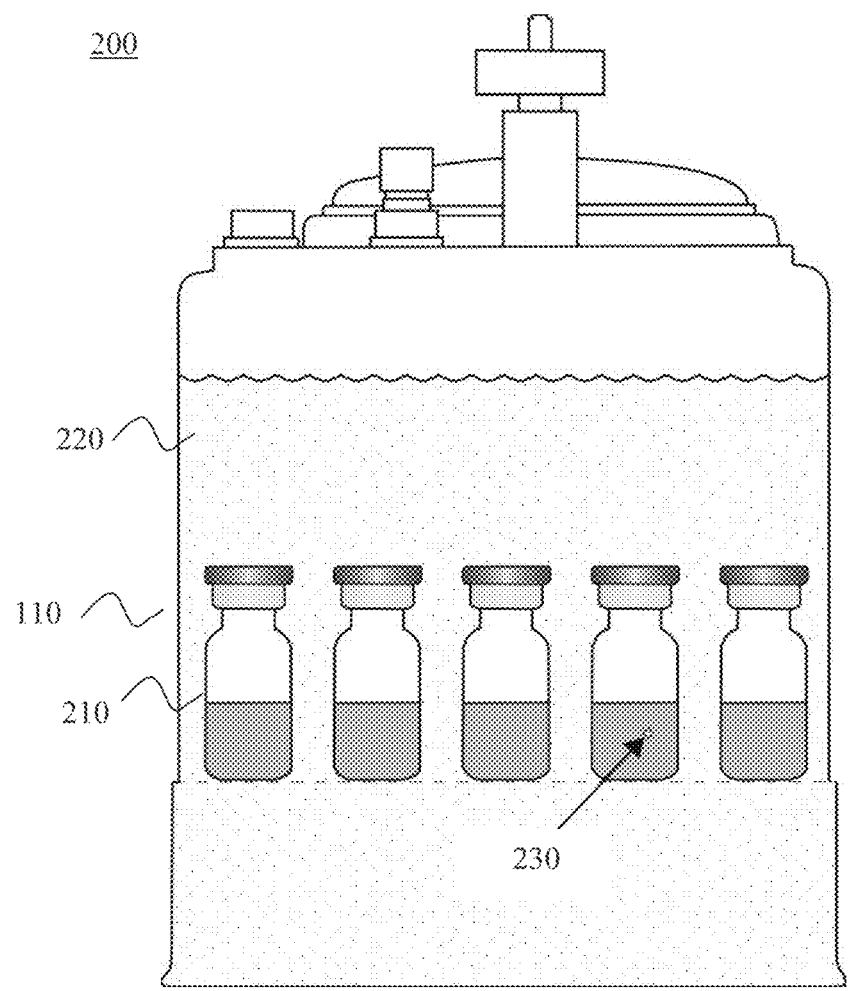
FIG. 2 is a schematic diagram of a pressure/vacuum chamber that contains a collection of containers and is filled with a carbonated liquid, according to an exemplary embodiment.
Figure 3:
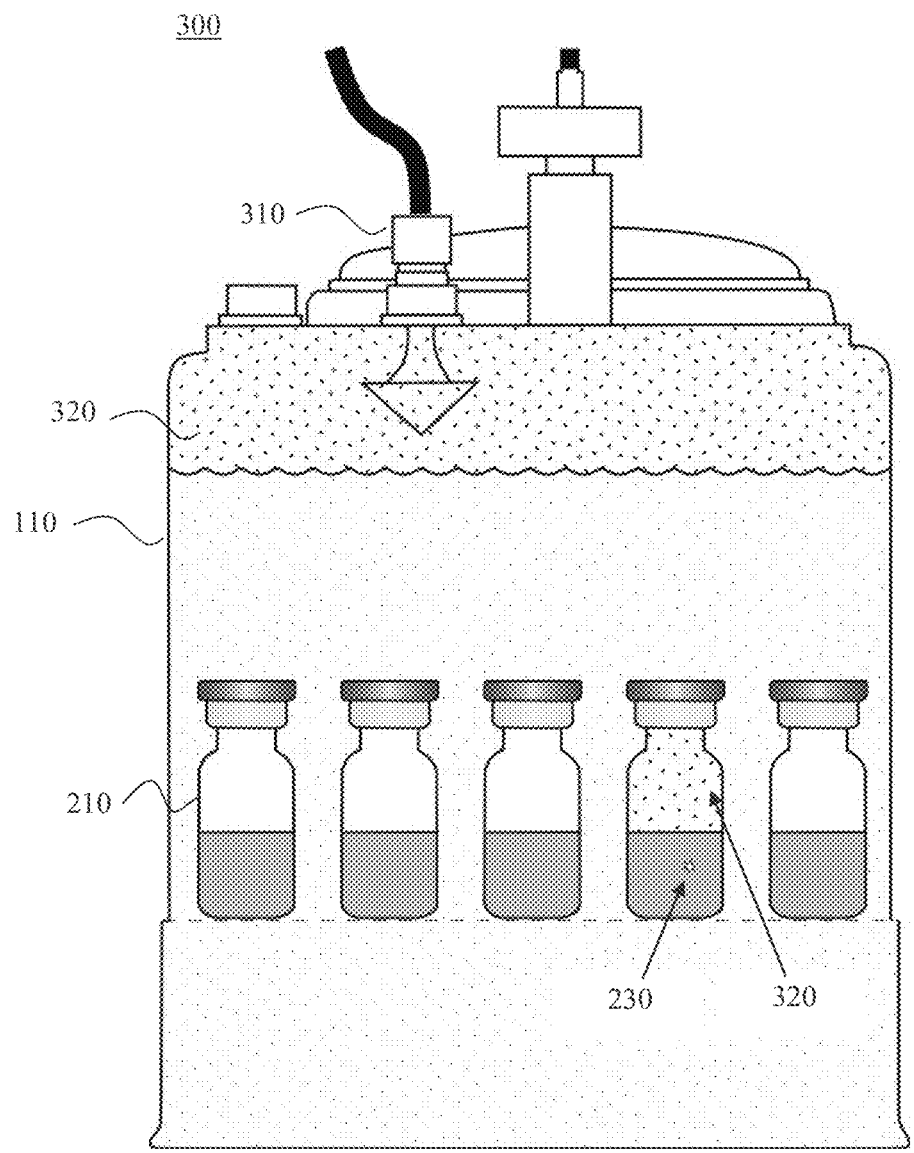
FIG. 3 illustrates the pressure/vacuum chamber of FIG. 2 after subjecting the collection of containers to a pressure cycle in order to introduce gas into the headspace of a container that has a doted, according to an exemplary embodiment.

FIG. 2 is a schematic diagram 200 of a pressure/vacuum chamber 110 that contains a collection of containers 210 and is filled with a carbonated liquid 220, according to an exemplary embodiment. FIG. 3 is a schematic diagram 300 that illustrates the pressure/vacuum chamber of FIG. 2 after subjecting the collection of containers to a pressure cycle in order to introduce gas into the headspace of a container that has a defect 230, according to an exemplary embodiment.

According to an exemplary embodiment, a method for testing the closure integrity of sealed containers includes the following steps: First, referring also to FIG. 2, the containers 210 are placed in the gas-tight and liquid-tight pressure chamber 110. Second, the chamber 110 is filled with a liquid 220 which has been saturated with a specific type of gas such that the containers 210 within the chamber are fully submerged. In this aspect, one of the containers 210 has a defect 230 that is located below the product level. In an exemplary embodiment, the "lever" of the product may be understood as referring to a height of the product along a vertical axis of a particular container 210, such that when the particular container 210 is vertically oriented, an amount of the product is contained below the level within the particular container 210, and a gaseous mixture is contained in a headspace of the particular container 210, i.e., above the level of the product within the particular container.

Third, a pressure cycle is executed. Referring also to FIG. 3, the pressure cycle uses a pressurizer 310 to introduce the same type of gas 320 as that which is already present in the liquid. The application of pressure effectively forces the liquid through any defects present in any of the containers 210 within the chamber. As illustrated in the container that has the defect 230, the gas 320 is present in the headspace of that container, i.e., above the level of the product in that container.

Fourth, the containers 210 are removed from the chamber 110, and then each container 210 is tested to determine Whether there has been a change in the partial pressure of the gas 320. The test is implemented by using a laser-based headspace analyzer. Fifth, the result of the measurement is used to determine whether the measured container is leaky, due to either a defect in the container walls or a failed container sealing mechanism.

By execution of the above-described method, it is possible to dissolve a sufficient amount of gas in a liquid such that when the liquid enters a container, the gas dissolved in the liquid will be released into the headspace. By quantifying the Change in the gas composition in the container using a laser-based headspace analyzer, the presence of a defect can be identified. The principle of this technique is based upon a well-established relation in physical chemistry known as Henry's law, which states that the amount of dissolved gas in a liquid is proportional to its partial pressure above the liquid. The proportionality factor is called the Henry's law constant.

When a liquid in equilibrium with a sufficiently high partial pressure of a gas enters a container with a relatively low partial pressure of that gas, a proportional amount of dissolved gas will be released into the headspace of the container, as predicted by Henry's law. A very common example of this phenomenon is seen in carbonated beverages. While the bottle containing the beverage is sealed, the atmosphere above the liquid is almost pure carbon dioxide ($CO_2$) at high pressure, and so there is a correspondingly high concentration of dissolved carbon dioxide in the liquid. When the bottle is opened, the partial pressure of $CO_2$ is reduced dramatically, and bubbles of $CO_2$ are formed in the liquid as the $CO_2$ comes out of solution.

In order to ensure a successful execution of the method, the gas 320 used should have a sufficiently high solubility in the liquid and the container 210 should have a small enough partial pressure of that same gas 320 such that the amount of liquid forced into the container 210 will release enough gas 320 for a change in the composition of the gas 320 in the headspace of the container to be quantified. For example, it is well known that $CO_2$ has a very high solubility in many common liquids, including water and most alcohols, such as, for example, isopropyl alcohol (IPA). These liquids are also capable of dissolving many types of salts and other excipients in pharmaceutical formulations, which may tend to mask defects by blocking, plugging, and/or clogging the defect. These properties make these combinations of gas and liquid well suited to this method. However, other liquid-gas combinations may be possible, and the method as described above with respect to an exemplary embodiment is not limited thereto.

Another requirement is that the gas 320 used has sufficiently strong absorption lines in the near-infrared frequency range used by current headspace analyzers. A list of such gasses includes oxygen, carbon dioxide, and/or any other suitable gas.

The vacuum-pressure cycle involved may be adapted to the container 210 being subjected to the method. Hold times at vacuums and elevated pressures may be adjusted based on the required sensitivity to smaller defects.

The following paragraphs describe some common difficulties experienced with conventional leak detection methods and how the method described above in accordance with one or more exemplary embodiments may overcome such difficulties.

Container closure integrity tests (CCIT) are currently used in the pharmaceutical industry as a means to ensure the continued sterility of sterile biological products and drugs once they have been sealed in containers, such as vials, using a known sterile process. The most common of these tests, particularly in the bio-pharmaceutical industry, is known as the dye ingress test. The dye ingress test involves placing sealed vials in a pressure chamber, submerging them in a liquid dye, and performing a vacuum-pressure cycle to force liquid into any vials which have defects. After the cycle is performed, the vials are cleaned and inspected visually to detect the presence of dye in the product solution in the vials.

Although the dye ingress test is one of the least sensitive tests available, it is preferred by many due to its perceived similarity with the mechanism of microbial ingress. Recent pressure from regulatory agencies to perform more quantitative, deterministic testing (e.g., USP<1207>) has prompted the creation of alternative methods including the use of optical spectrometers to detect the presence of dye in containers and the use of florescent dyes to aid in visual inspection. A significant drawback to the dye ingress test is that it is considered destructive, thereby making it less suitable for inclusion in stability protocols and not suited for 100% inspection of product containers. In addition, none of these methods have been proven to be as sensitive as other non-liquid tests, such as helium leak testing or laser-based headspace analysis.

Laser-based headspace analysis is a well-established, highly accurate technique for quantitatively characterizing the gas or gasses present in transparent containers, and this technique is often employed particularly in the pharmaceutical industry. The technique consists of directing frequency modulated laser light through a container and sweeping the center frequency of the laser through a rotational-vibrational resonance of a particular gas. The resulting signal can be analyzed to determine the partial pressure of the gas in question, or to indicate the total pressure of all of the gasses in the container when knowledge of the composition of the other gasses is known a priori, such as in the case of an air-filled container, in view of the fact that the primary gas constituents of air are oxygen (21% and nitrogen (78%).

When used for container closure integrity testing, headspace analysis techniques require a change in the headspace gas composition within the container. Such a change leads to an inference that this change is due to the ingress or egress of gas through a defect in said container. For example, a lyophilized (freeze dried) pharmaceutical product stored in a sealed glass container under vacuum may be a candidate for container closure integrity testing. If such a container is analyzed for the presence of oxygen and oxygen is detected, it would then be inferred that air has entered the container through a defect, and therefore, that container's closure is non-integral and the container has leaked. Conversely, if instead no oxygen is detected, then the container is considered properly sealed and intact.

However, although the laser-based headspace analysis technique is non-destructive, deterministic, and more sensitive than the dye ingress test methods, the laser-based headspace analysis technique faces two distinct disadvantages when defects are located below the product level in a container.

The first disadvantage is that as gas is forced into the container, the liquid surface at the defect begins to deform into a bubble. For a perfectly circular defect, the bubble diameter would eventually approach the diameter of the circular defect. The pressure difference that is required to deform the surface at a gas-liquid interface due to the surface tension of the liquid is known as the Laplace Pressure and is inversely proportional to the radius of curvature of the liquid surface. This means that smaller defects require higher external pressures to force gas bubbles into the container. For example, based on the surface tension of water, the pressure difference at the interface of a 5-micron bubble may be estimated as being approximately equal to 432 torr. The use of a liquid as the carrier fluid for the tracer gas reduces the pressure required to move liquid into the container, thereby facilitating the detectability to smaller defects. Gas bubbles that may be trapped in the defect will be forced back into solution as the external pressure is increased.

Second, defects in a container which occur below the level of the product in the container may become Obstructed or completely blocked by the product in the container, thereby preventing ingress of gas into the container and therefore detection of these defects. This issue also plagues the dye ingress test.

Conversely if the container is immersed in a liquid with a sufficiently high concentration of dissolved gas, the precipitate plugging the defect would be re-dissolved, thereby unplugging the defect and allowing the flow of liquid into the container. Once inside the container, the gas in solution would come to a new equilibrium with the headspace in the container and could be detected by the headspace analyzer.

The methods described herein in accordance with one or more exemplary embodiments may effectively remedy the above-described disadvantages of conventional CCIT methods. First, the use of a dye-free liquid, such as, for example, 70% IPA in water, effectively renders the test non-destructive. Thus, the same container may be tested multiple times during a stability protocol, and larger pressure chambers may be used to perform testing on statistically meaningful sample sizes, and/or 100% inspection of containers may be implemented, depending on the throughput required. The use of laser-based headspace analysis significantly improves the sensitivity of test, and as such, quantitative reject limits may be determined during method validation.

The use of a liquid solvent (e.g.; 70% IPA in water) removes the surface tension barrier that exists for defects that are located below the level of a liquid product, thus reducing the pressure required to force liquid into the container, and thereby improving the detectability of smaller defects. Gas bubbles that may be trapped in the defect will be forced back into solution as the external pressure is increased.

Further, liquid systems such as 70% IPA in water are excellent solvents for many salts, excipients, and active product ingredients, including proteins, that are often used in pharmaceutical formulations. Precipitates generated in the defect that obstruct the flow of gas through the defect may be resolubilized and thereby permit the flow of the liquid carrier into the container.

Finally, the CCIT methods described above in accordance with one or more exemplary embodiments retain the high sensitivity, deterministic and quantitative advantages associated with laser-based headspace analysis.

Figure 4:
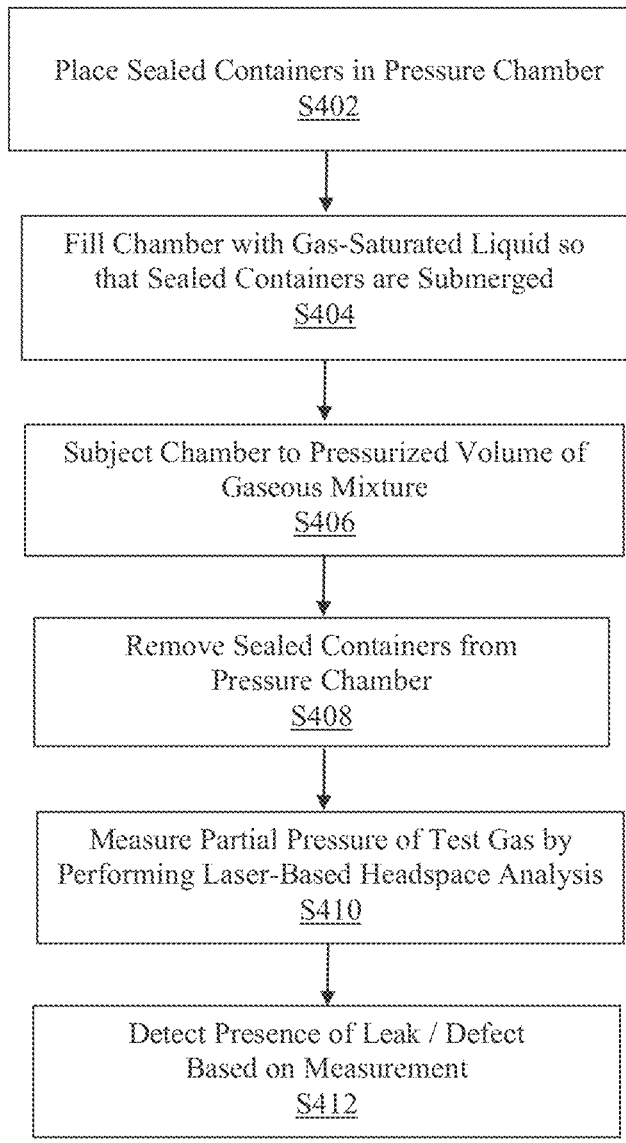
FIG. 4 is a flowchart of a process for identifying a defect in optically transparent containers in which the defect may be dogged by the presence of a substance in the defect, according to an exemplary embodiment.

An exemplary process for detecting leaks in closed containers, and more particularly to methods and systems for identifying a defect in optically transparent containers in which the defect may be clogged by the presence of a substance in the defect is generally indicated at flowchart 400 in FIG. 4.

In the process 400 of FIG. 4, at step S402, a batch of sealed containers to be tested are placed into a pressure chamber. In an exemplary embodiment, the sealed containers contain a product, such as a pharmaceutical product, that includes a solution having a liquid solvent and at least one solute substance, such as, for example, a salt, an excipient, and/or an active ingredient such as a protein. When each sealed container is vertically oriented, the solution contained therein fills the respective container up to a specific level, and therefore, if a particular container has a defect that is located on the body of the container below the specific level of the solution, then it is possible that the defect will be blocked, clogged, or plugged by a substance that is contained in the solution. In this circumstance, the fact that the defect is blocked, clogged, or plugged by the substance generally makes it more difficult to detect the defect, i.e., the detectability, of the defect is reduced by the presence of the substance.

At step S404, the pressure chamber is partially filled with a liquid that is saturated by a test gas. The amount of the liquid is sufficient to ensure that the sealed containers are fully submerged within the liquid. In an exemplary embodiment, the liquid may include water, an organic solvent (i.e., a solvent that includes at least one ingredient that has carbon as a constituent element), and/or an alcohol solution, such as, for example, a 70% isopropyl alcohol (IPA) solution in water.

For a sealed container that has a defect located on the body of the container below the specific level of the pharmaceutical product solution such that the defect is blocked, plugged, or clogged by a substance contained within the solution, the submersion of the sealed container in the gas-saturated liquid may cause a reduction in the surface tension that exists at the defect between the pharmaceutical product solution and the gas-saturated liquid. Alternatively, the submersion of the sealed container in the gas-saturated liquid may cause the substance contained within the solution to become dissolved in the gas-saturated liquid.

At step S406, the pressure chamber is subjected to a pressurized volume of a gaseous mixture that includes the test gas for a predetermined amount of time. In this manner, the sealed containers are effectively subjected to an overpressurization in order to force the gas-saturated liquid into any sealed container that has a detect or a leak. The gaseous mixture may include air, and the test gas may include any one or more of nitrogen, oxygen, and carbon dioxide. The predetermined amount of time for Which the pressure chamber is subjected to the overpressurization operation may be, for example, 10 minutes, 30 minutes, one hour, or any other suitable amount of time as determined by a person that is conducting the test.

At step S408, after the predetermined amount of time has elapsed, the sealed containers are removed from the pressure chamber. Then, at step S410, for each individual sealed container, a measurement of the partial pressure of the test gas contained within that respective sealed container is made. In an exemplary embodiment, the measurement is implemented by performing a laser-based headspace analysis of the sealed container. For a sealed container that is optically transparent, the headspace of the container (i.e., the portion of the container that is above the level of the pharmaceutical product solution) may be tested by propagation of a laser therethrough, and the received laser may be analyzed to determine the measurement of the partial pressure of the test gas.

At step S412, a result of the measurement is used to detect the presence of a leak and/or defect. In this aspect, when a specific sealed container has a leak and/or a defect, the overpressurization operation of step S406 will have caused the gas-saturated liquid into the container at the location of the defect, and the presence of the test gas within the gas-saturated liquid will then effectively increase the amount of the test gas that is present within the container, and therefore, the measurement performed in step S410 will show an increase in the partial pressure of the test gas, as compared with a predetermined threshold level, such as, for example, the pre-test partial pressure level. Conversely, for other sealed containers that do not have any leaks or defects, the integrity of such a container will have effectively prevented the gas-saturated liquid from entering those containers, and as a result, the partial pressure of the test gas will be unchanged, as compared with the predetermined threshold level and/or the pre-test partial pressure level.

Accordingly, with this technology, an optimized process for detecting a defect in optically transparent container in which the defect may be clogged by the presence of a substance in the defect is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means; materials and embodiments, the invention is not intended to be limited to the particulars disclosed; rather the invention extends to all functionally equivalent structures, methods, and uses such as are within the scope of the appended claims.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for detecting a defect in a sealed container, comprising:
    placing the sealed container in a pressurizable chamber;
    filling the chamber with at least a first amount of a first liquid that is saturated by a first gas, the first amount being sufficient to cause the sealed container to be fully submerged within the first liquid;
    subjecting the chamber to a pressurized volume of a first gaseous mixture that includes the first gas for at least a predetermined interval of time, the pressurized volume of the first gaseous mixture having a pressure level that is greater than a preexisting pressure exerted within the sealed container;
    after the predetermined interval of time has elapsed, removing the sealed container from the chamber;
    measuring a partial pressure of the first gas contained within the sealed container; and
    determining, based on a result of the measuring, whether the sealed container has the defect,
    wherein the sealed container contains a second amount of a substance that includes at least one from among a second liquid and a solid material, the second amount corresponding to a level of the substance such that when the sealed container is vertically oriented, the second amount of the substance is contained below the level within the sealed container, and a second gaseous mixture is contained above the level within the sealed container; and
    wherein the defect is located on a body of the sealed container that is below the level of the substance.

2. The method of claim 1, wherein the first liquid includes at least one from among water, an organic solvent, and an alcohol solution.

3. The method of claim 1, wherein the measuring comprises performing a laser-based analysis of a portion of the sealed container that is above the level of the substance.

4. The method of claim 1, wherein the substance includes a pharmaceutical product that includes at least one from among a salt, an excipient, and an active ingredient, and wherein a detectability of the defect is reduced by a presence of the substance within the defect.

5. The method of claim 4, wherein when the substance includes the second liquid, the first liquid eliminates a surface tension between the first liquid and the second liquid at the defect, such that the subjecting of the chamber to the pressurized volume of the first gaseous mixture causes the first liquid to flow into the sealed container via the defect.

6. The method of claim 4, wherein the substance within the defect becomes dissolved in the first liquid, such that the subjecting of the chamber to the pressurized volume of the first gaseous mixture causes the first liquid to flow into the sealed container via the defect.

7. An apparatus for detecting a defect in a sealed container, comprising:
    a pressurizable chamber configured to receive the sealed container and to receive at least a first amount of a first liquid that is saturated by a first gas, the first amount being sufficient to cause the sealed container to be fully submerged within the first liquid;
    a gas cylinder configured to supply a pressurized volume of a first gaseous mixture to the chamber for at least a predetermined interval of time, the pressurized volume of the first gaseous mixture having a pressure level that is greater than a preexisting pressure exerted within the sealed container; and
    a measuring device configured to measure a partial pressure of the first gas from within the sealed container after the predetermined interval of time,
    wherein the defect is detectable based on a result of the measured partial pressure of the first gas,
    wherein the sealed container is configured to contain a second amount of a substance that includes at least one from among a second liquid and a solid material, the second amount corresponding to a level of the substance such that when the sealed container is vertically oriented, the second amount of the substance is contained below the level within the sealed container, and a second gaseous mixture is contained above the level within the sealed container; and
    wherein the defect is located on a body of the sealed container that is below the level of the substance.

8. The apparatus of claim 7, wherein the first liquid includes at least one from among water, an organic solvent, and an alcohol solution.

9. The apparatus of claim 7, wherein the measuring device comprises a headspace analysis device configured to perform a laser-based analysis of a portion of the sealed container that is above the level of the substance.

10. The apparatus of claim 7, wherein the substance includes a pharmaceutical product that includes at least one from among a salt, an excipient, and an active ingredient, and wherein a detectability of the defect is reduced by a presence of the substance within the defect.

11. The apparatus of claim 10, wherein when the substance includes the second liquid, the first liquid is configured to eliminate a surface tension between the first liquid and the second liquid at the defect, such that when the chamber is subjected to the pressurized volume of the gaseous mixture, the first liquid is caused to flow into the sealed container via the defect.

12. The apparatus of claim 10, wherein the first liquid is configured to cause the substance within the defect to become dissolved in the first liquid, such that when the chamber is subjected to the pressurized volume of the first gaseous mixture, the first liquid is caused to flow into the sealed container via the defect.

13. A method for detecting a defect in a first sealed container, comprising:
    placing a plurality of sealed containers in a pressurizable chamber, the plurality of sealed containers including the first sealed container;
    filling the chamber with at least a first amount of a first liquid that is saturated by a first gas, the first amount being sufficient to cause each of the plurality of sealed containers to be fully submerged within the first liquid;
    subjecting the chamber to a pressurized volume of a first gaseous mixture that includes the first gas for at least a predetermined interval of time, the pressurized volume of the first gaseous mixture having a pressure level that is greater than an ambient pressure being exerted on the plurality of sealed containers by the first liquid;

after the predetermined interval of time has elapsed, removing the plurality of sealed containers from the chamber;

measuring a partial pressure of the first gas contained within the first sealed container; and determining, based on a result of the measuring, whether the first sealed container has the defect, wherein the first sealed container contains a second amount of a substance that includes at least one from among a second liquid and a solid material, the second amount corresponding to a level of the substance such that when the first sealed container is vertically oriented, the second amount of the substance is contained below the level within the first sealed container, and a second gaseous mixture is contained above the level within the first sealed container; and wherein the substance includes a pharmaceutical product that includes at least one from among a salt, an excipient, and an active ingredient, and wherein a detectability of the defect is reduced by a presence of the substance within the defect.

14. The method of claim 13, wherein the measuring comprises performing a laser-based analysis of a portion of the first sealed container that is above the level of the substance.

15. The method of claim 13, wherein the defect is located on a body of the first sealed container that is below the level of the substance.

16. The method of claim 13, wherein the defect is located on a body of the first sealed container that is at least partially above the level of the substance.

17. The method of claim 13, wherein when the substance includes the second liquid, the first liquid causes a reduction in an amount of surface tension between the first liquid and the second liquid at the defect, such that the subjecting of the chamber to the pressurized volume of the first gaseous mixture causes the first liquid to flow into the first sealed container via the defect.

18. The method of claim 13, wherein the substance within the defect becomes dissolved in the first liquid, such that the subjecting of the chamber to the pressurized volume of the first gaseous mixture causes the first liquid to flow into the first sealed container via the defect.

* * * * *